No. 663,391. Patented Dec. 4, 1900.
B. ORBISON.
WOODWORKING MACHINE.
(Application filed Mar. 31, 1899.)
(No Model.) 5 Sheets—Sheet 2.
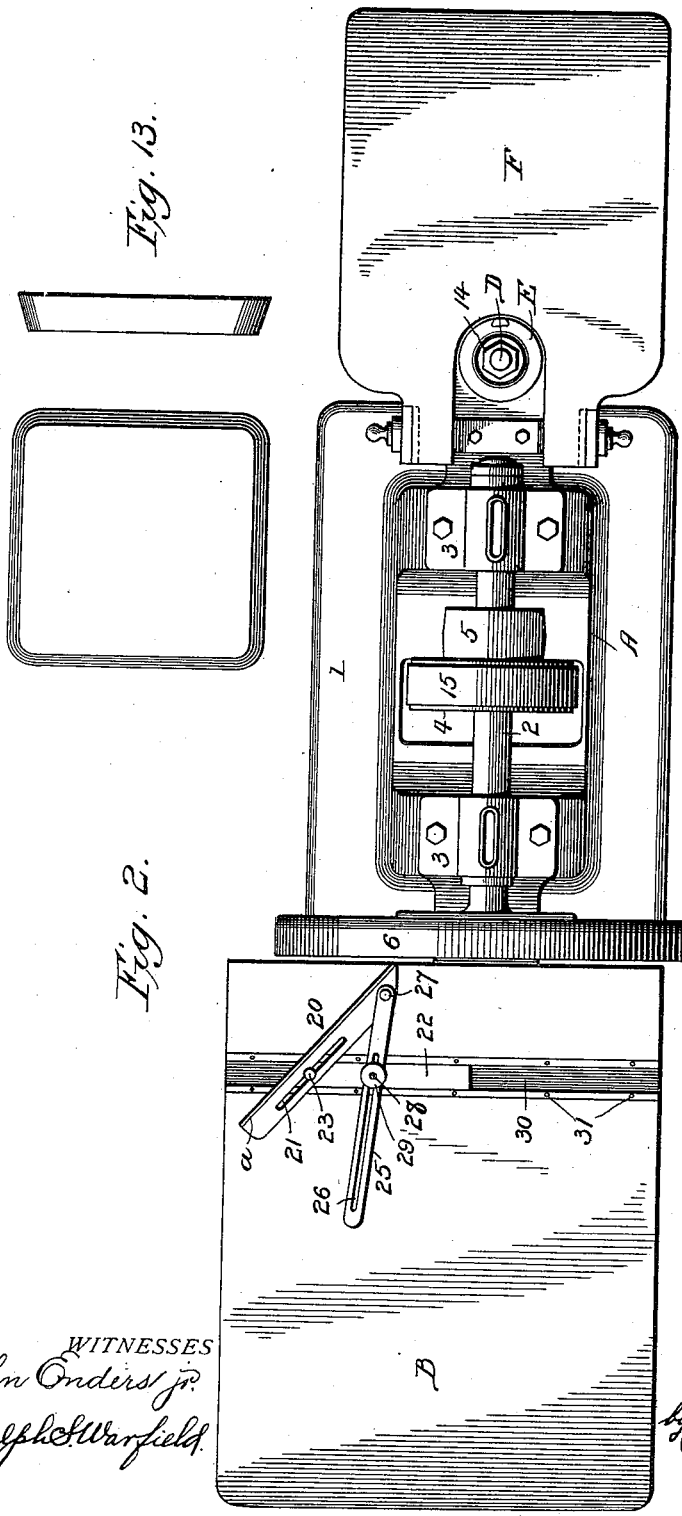
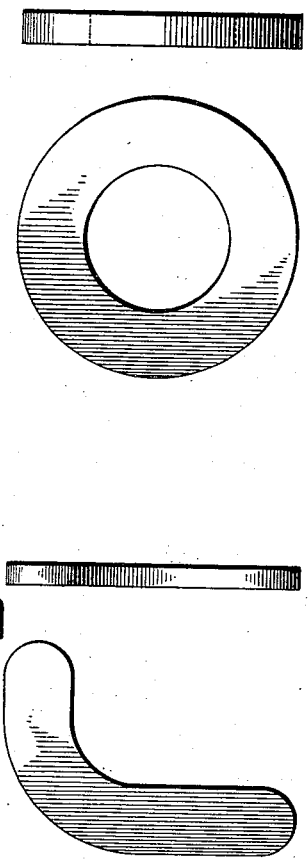
WITNESSES
INVENTOR No. 663,391. B. ORBISON. Patented Dec. 4, 1900.
WOODWORKING MACHINE.
(Application filed Mar. 31, 1899.)
(No Model.) 5 Sheets—Sheet 3.
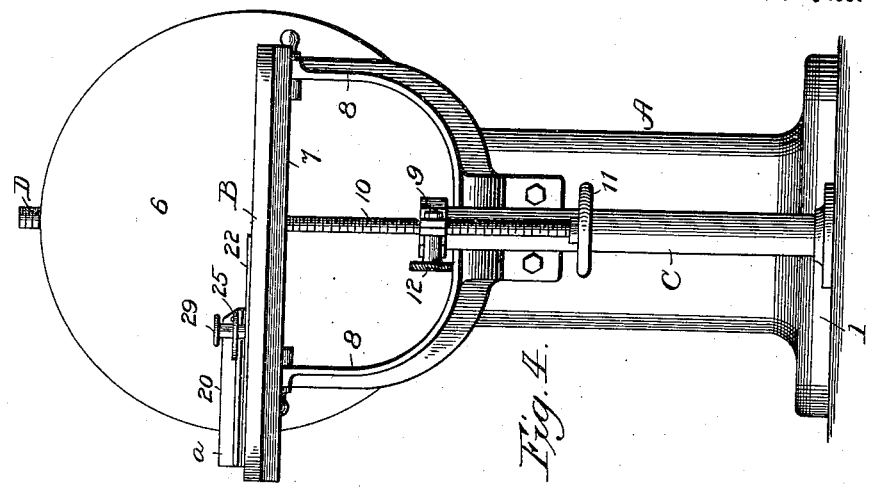
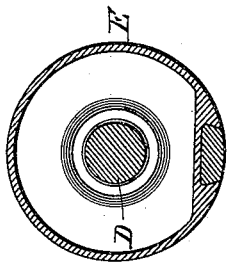
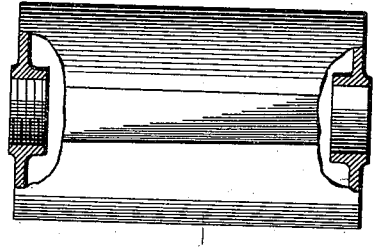
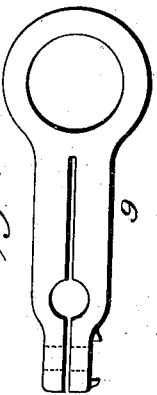
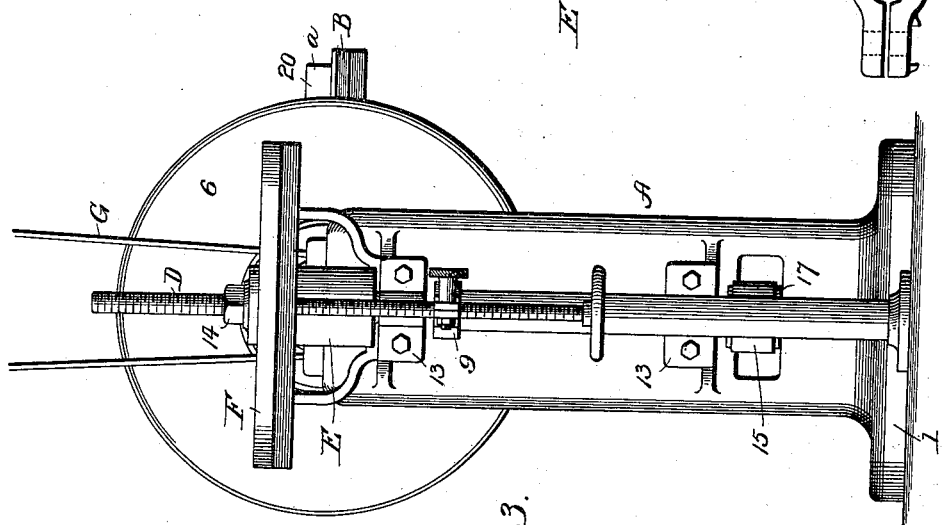
WITNESSES
INVENTOR No. 663,391. B. ORBISON. Patented Dec. 4, 1900.
WOODWORKING MACHINE.
(Application filed Mar. 31, 1899.)
(No Model.) 5 Sheets—Sheet 4.

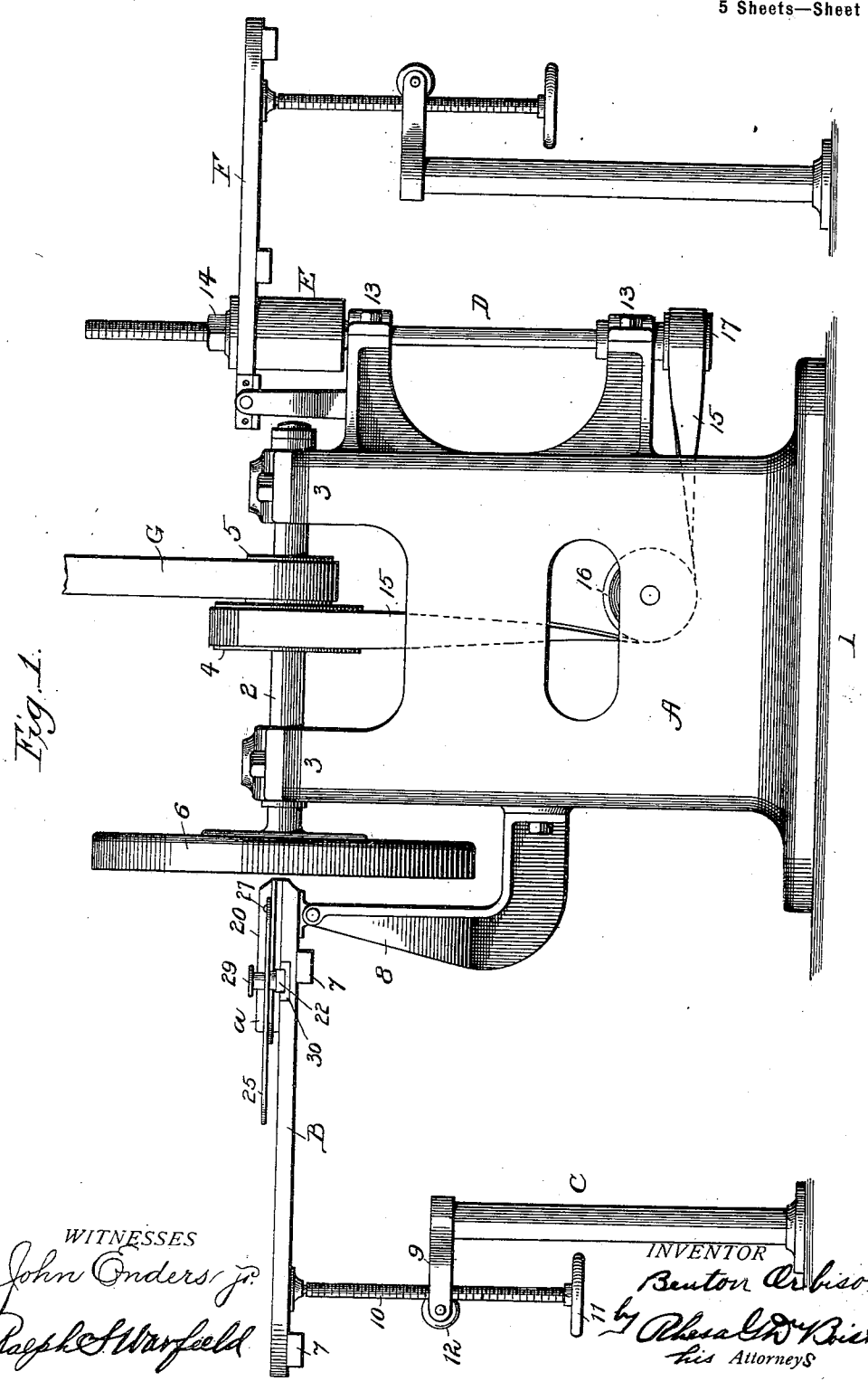

WITNESSES
INVENTOR
Benton Orbison
Attorneys

No. 663,391. Patented Dec. 4, 1900.
B. ORBISON.
WOODWORKING MACHINE.
(Application filed Mar. 31, 1899.)
(No Model.) 5 Sheets—Sheet 5.

WITNESSES
John Enders, Jr.
Ralph K. Warfield.

INVENTOR
Benton Orbison
by Chesal W. Bois &c.
his Attorneys.

UNITED STATES PATENT OFFICE.

BENTON ORBISON, OF CHICAGO, ILLINOIS.

WOODWORKING-MACHINE.

SPECIFICATION forming part of Letters Patent No. 663,391, dated December 4, 1900.

Application filed March 31, 1899. Serial No. 711,235. (No model.)

*To all whom it may concern:*

Be it known that I, BENTON ORBISON, a citizen of the United States of America, residing at Chicago, in the county of Cook and State of Illinois, have invented certain new and useful Improvements in Woodworking-Machines, of which the following is a specification.

My invention relates to an improvement in woodworking-machines, and more particularly to that class of machinery known as "sandpapering-machines."

It is very necessary in pattern-work particularly to have the parts perfectly straight when finished; and to accomplish this end it is a primary object of my invention to provide a machine of such construction that sandpaper can be easily and quickly applied and at a point where its work will be most effectual in its results and also to furnish means for adjustment of the tables upon which the work rests and for gaging the work, so that the sandpapering may take place at the desired angle with respect to the work to impart the required finish to the surface undergoing treatment.

A further object is to provide means for guiding the work in instances where more than one piece of the same kind is to be finished without the necessity of resetting the table.

Further objects are to provide a simple machine of comparatively few parts which will be effectual in the accomplishment of the work required; and the invention consists in certain features of construction and novel combinations of parts, which will be hereinafter more fully described, and particularly pointed out in the claims.

Figure 8:
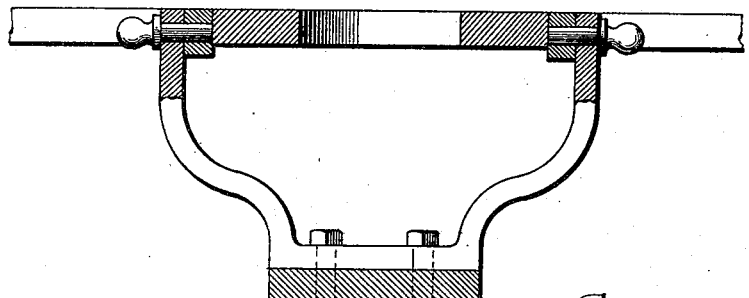
Figure 9:
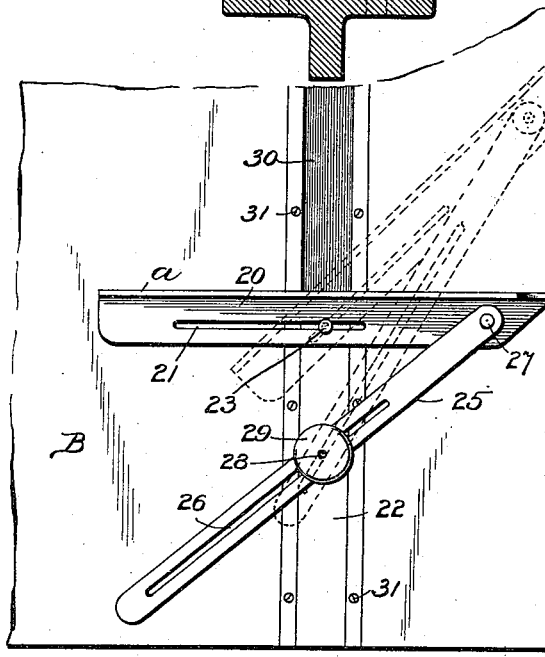
Figure 12:
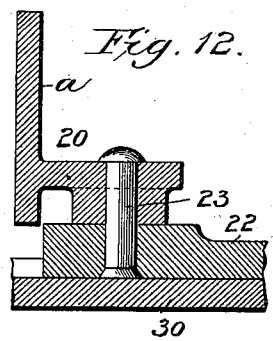
Figure 10:
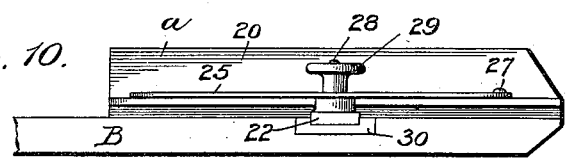
Figure 11:
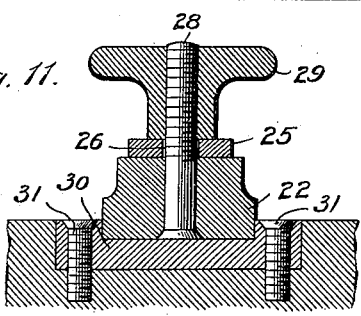
Figure 16:
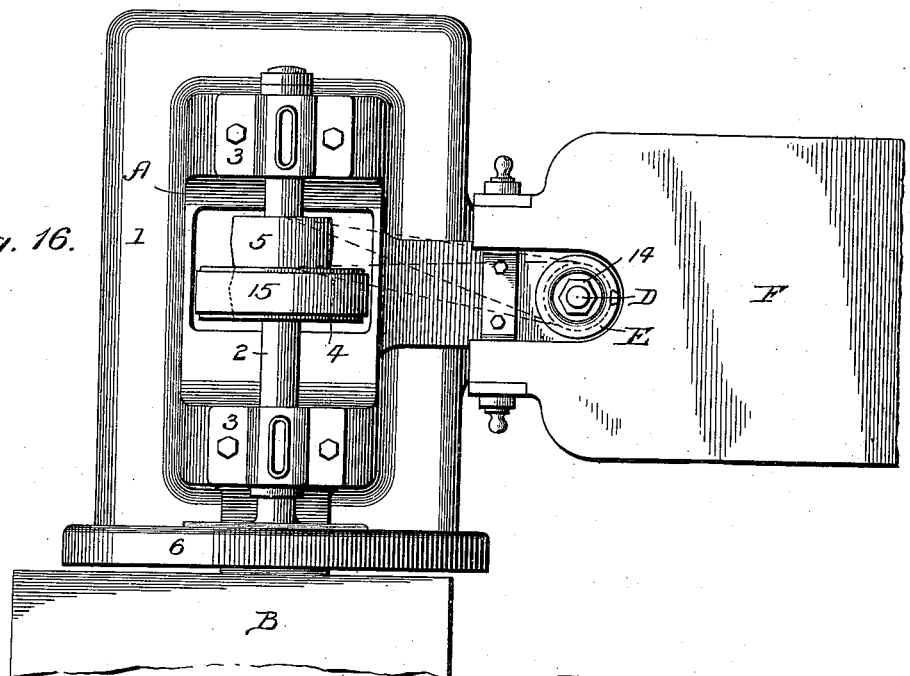
Figure 17:
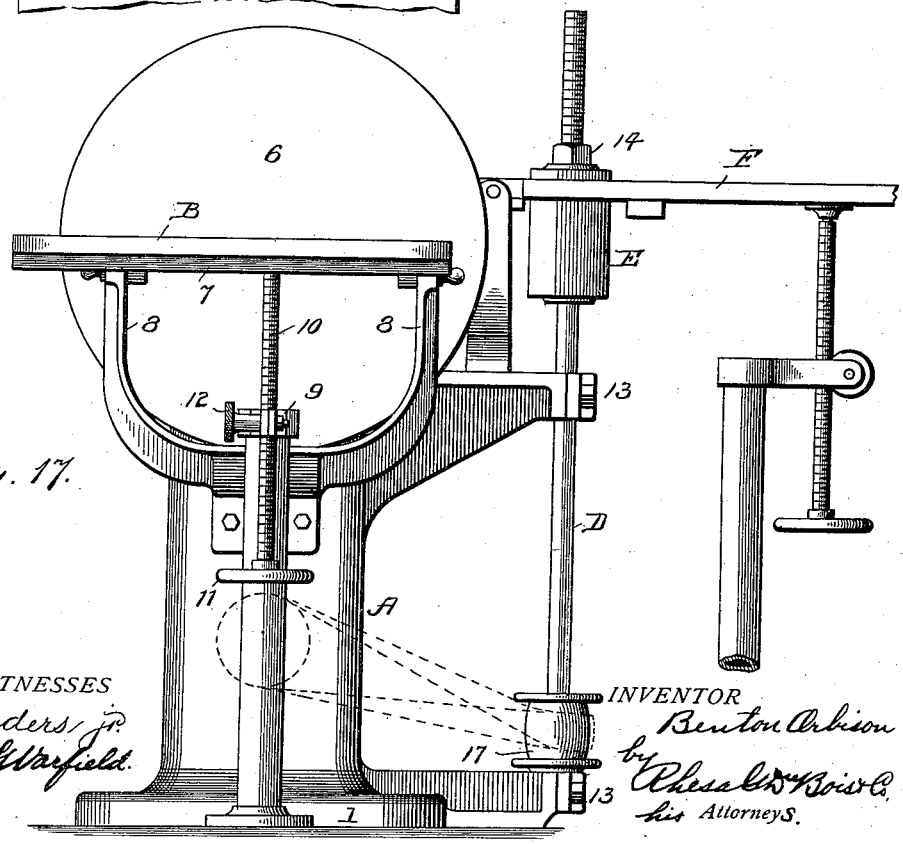

In the accompanying drawings, Figure 1 is a view in side elevation of a form of my machine. Fig. 2 is a plan view of the same. Figs. 3 and 4 are views of opposite ends. Fig. 5 is a horizontal section, and Fig. 6 is a side elevation, partly in section, of the vertical drum E. Fig. 7 is a view of the split nut or bracket 9. Fig. 8 is a vertical section through the hinged end of table F and the bracket which supports it. Fig. 9 is a plan view of the table B and its attachments. Fig. 10 is a view in elevation of the same. Figs. 11 and 12 are enlarged sections through the parts shown in Figs. 9 and 10. Figs. 13, 14, and 15 are views of a few specimens of work finished on my improved machine. Figs. 16 and 17 are views in plan and elevation, respectively, of a slightly-modified form of machine.

A represents the main portion or body of the machine, it being erected from a pedestal $i$, adapted to rest upon the floor in the usual manner of the construction of machines of this character. A horizontal shaft 2 is journaled in pillow-blocks 3 3 in the top of the machine-body, and this shaft has keyed thereon cone-pulleys 4 5. On one end of shaft 2 is secured a wooden block 6, and on the latter the sandpaper or garnet-paper is glued. This may be glued on layer after layer as each layer wears out until several layers are accumulated, when they can all be removed and new layers applied. This shaft, with its disk or face-plate, is driven by a belt passed over pulley 5.

A table B is provided upon which to rest the work while being operated upon by the sandpaper or garnet-paper disk. This table may be made of wood, with cross-cleats 7 7 on its lower side to prevent it from warping, and it is preferably hinged at its inner edge to the upper end of the arm 8, which latter extends outward from the main or body portion A of the machine conveniently at a point just below the rotary disk. A post or pillar C supports the outer end of this table. Split nut or bracket 9 is secured at or near the upper end of this post or pillar, and through this a screw-jack 10 extends upward beneath and constituting a rest for the table. On the lower end of this screw a hand-wheel 11 is secured, whereby to easily turn the screw to change the angle of the table either above or below horizontal to obtain the desired angle or taper relative to the disk. This adjustment is very necessary, as all patterns must have a little draft and quite frequently different bevels are wanted. When the required inclination of the table is reached, a set-screw 12 in the split nut or bracket is screwed up tightly to lock the screw 10 in position.

Table B may be furnished with a guide 20. This may be made of cast-iron, with a vertical flange $a$ on its working edge and provided with a longitudinal slot 21 of considerable length in its horizontal portion. This guide is preferably pivoted to a slide 22 by means of a pin 23, which extends through slot 22. An adjusting-bar 25, also longitudinally slotted, as at 26, is pivoted at 27 to the guide, and a screw 28, extending upward from the slide, passes through slot 26, and a thumb-nut 29 on this screw is used to secure the adjusting-plate in different positions, as indicated in full and dotted lines, for setting the guide at a variety of different angles—from square to any acute or obtuse angle to an angle of forty-five degrees or any of the intermediate positions. The slide is pivoted in a guideway 30, sunk in the table, where it is held by screws or bolts, as at 31. Thus it will be seen that the slide may be shifted in its guidway to any position across it, and the guide 20 may be set to a variety of different angles, as stated, according to the work to be finished.

In addition to the disk 6, for finishing exterior surfaces more particularly, provision is made in my present invention for finishing inside curves. This is accomplished by the following mechanism: Either at one end, as in Fig. 1 or Fig. 2, opposite from the disk 6, or at one side, as shown in the modification, a vertical shaft D is journaled in suitable boxes 13 13, projecting outward from the main body of the machine. This shaft is preferably screw-threaded for a portion of its length at its upper end, and on this portion the vertical drum E is secured. This drum has a plain bore at its lower end and is screw-threaded at its upper end to turn upon the threads of the shaft, the object of which construction is to afford a means of vertical adjustment of the drum upon the shaft, and to lock the drum in place a nut 14 is driven securely against the upper end of the drum. This drum is provided with a dovetailed groove which preferably extends throughout its length and gradually tapers slightly from one end to the other. Correspondingly-shaped strip or strips of wood are provided to fit this groove, and usually several of these are kept in stock for convenience. On the outer face of these strips sandpaper or garnet-paper is securely glued. The sheet-iron templet is furnished with the machine for cutting the paper to the proper length. The paper is supposed to be cut a trifle short and when put on the drum to be slightly dampened, which causes it to expand. It then shrinks on the drum, which insures its being perfectly tight thereon. By having several of these dovetailed strips on hand one can be supplied for another as fast as needed, and by means of the vertical adjustment of the drum all portions of the paper may be utilized, and thus waste is avoided. Table F is supported and adjusted like table B, and hence need not be more fully described. Shaft D is driven by a belt 15, passed over pulley 4 beneath loose pulleys 16 16, and thence around sheaves 17 on the lower end of shaft D. By removing the drum cutter-heads could be substituted.

Two or three illustrations of the work which may be done on this machine are shown in the drawings. The first two figures show a front and edge view of a block of wood—say ten by ten inches square by an inch and a half thick. Such a block can be finished on this machine in about three minutes as against one hour if done by ordinary means. In the next two figures is shown a pattern which can be finished on the edges in about four minutes as against two or three hours ordinarily. In this form the disk operates on the outer surface and the drum on the inner curve. In the pattern shown in the remaining two figures the whole block can be finished in about six minutes, the outside being finished on the disk and the inside on the drum. Of course rings of any diameter can be finished inside or outside, just so that the bore is large enough to receive the drum, and the interior opening may be square or of any desired angle or taper, providing that it is large enough to admit the drum. Thus it will be seen that the machine saves a great deal of time and labor, and at the same time it consists of comparatively few parts, all of which are made strong and durable.

The operation need hardly be described, as it is clear from the drawings. Power is applied through the belt G in the usual manner from an overhead shaft to drive the main shaft 2 of the machine. This rotates the disk 6, and through the medium of the pulley 4 and belt 15, passed over it and around sheaves 17, the vertical shaft D is driven. The work is placed on either of the tables B or F, and they may each be tilted to the desired inclination.

Slight changes may be made in the form and construction of the several parts described without departing from the spirit and scope of my invention, and hence I do not wish to limit myself to the precise details herein described; but,

Having thus described my invention, what I claim as new, and desire to secure by Letters Patent, is—

1. The combination with a table, of a guide adjustably pivoted thereto and an adjusting-plate pivotally connected with the guide, and means for setting the said plate whereby the angle of the guide may be changed.

2. The combination with a table and a slide, of a guide pivoted to the slide, and an adjusting-plate pivoted to the guide and adjustably connected with the table.

3. The combination with a table and a guideway, of a slide, and a slotted guide pivoted to the slide, and a slotted adjusting-plate pivoted to the guide and adjustably connected with the slide.

4. The combination with a shaft having a disk on one end, said disk faced with sand, emery or garnet paper, of a table hinged at one edge in position opposite the center of the disk whereby the work thereon is capable of engaging the largest possible surface of the disk, said table being of a width approximately equal to the diameter of the disk, a screw-jack for varying the angle of the table, a split nut for the passage of the screw-jack, and a set-screw in the split nut for locking the screw-jack in position.

BENTON ORBISON.

In presence of—
PHILIP J. KEENE,
AMBROSE B. MORRIS.